United States Patent
Kotrla et al.

(10) Patent No.: US 10,316,622 B2
(45) Date of Patent: Jun. 11, 2019

(54) TETHERED TRACKING SYSTEM

(71) Applicant: Cameron International Corporation, Houston, TX (US)

(72) Inventors: Johnnie Kotrla, Katy, TX (US); James Joseph Hogan, Houston, TX (US); Ross Edward Stevenson, Hockley, TX (US); Jesse John Garcia, Sr., Katy, TX (US)

(73) Assignee: Cameron International Corporation, Houston, TX (US)

( * ) Notice: Subject to any disclaimer, the term of this patent is extended or adjusted under 35 U.S.C. 154(b) by 450 days.

(21) Appl. No.: 14/965,710

(22) Filed: Dec. 10, 2015

(65) Prior Publication Data

US 2017/0168194 A1    Jun. 15, 2017

(51) Int. Cl.
  *G01V 1/38*   (2006.01)
  *E21B 33/06*  (2006.01)
  *E21B 41/00*  (2006.01)

(52) U.S. Cl.
  CPC .......... *E21B 41/0007* (2013.01); *E21B 33/06* (2013.01); *G01V 1/38* (2013.01)

(58) Field of Classification Search
  CPC ...... G01V 15/00; G01V 1/38; E21B 41/0007; E21B 33/06
  USPC ...................................................... 73/152.54
  See application file for complete search history.

(56) References Cited

U.S. PATENT DOCUMENTS

| | | | |
|---|---|---|---|
| 8,054,712 B1* | 11/2011 | Kasper | G01C 13/00 367/128 |
| 9,727,062 B2* | 8/2017 | Kocurek | G05D 23/025 |
| 9,729,253 B2* | 8/2017 | Tobias | H04B 13/02 |
| 2006/0195263 A1* | 8/2006 | Meinig | G01V 1/008 702/3 |
| 2016/0015885 A1* | 1/2016 | Pananen | A61M 5/142 604/111 |

* cited by examiner

*Primary Examiner* — Lisa M Caputo
*Assistant Examiner* — Suman K Nath
(74) *Attorney, Agent, or Firm* — Helene Raybaud (57) ABSTRACT

A tracking system includes a tether, a buoyant transmitter assembly coupled to a first portion of the tether, an attachment component coupled to a second portion of the tether. The attachment component is configured to couple the tracking system to an object, and the tether enables the buoyant transmitter assembly to float above the object while the object and the tracking system are submerged in a fluid.

20 Claims, 6 Drawing Sheets

TETHERED TRACKING SYSTEM

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Oil and gas wells are often used to access resources below the surface of the earth. For instance, oil, natural gas, and water are often extracted via a well. Offshore platforms may be used to support equipment for extracting the resources from wells located at the ocean floor. Offshore cranes or other floating transport vessels may be used to transport the equipment from land to the offshore platform. The equipment may be dropped during transport, during installation at the offshore platform or well, and/or may separate from the offshore platform during drilling operations, for example. Accordingly, it may be advantageous to provide a reliable tracking system to facilitate locating dropped objects, such as drilling equipment, at the ocean floor.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present embodiments are generally directed to systems for tracking or locating objects. More particularly, the present embodiments are directed to tracking systems for tracking or locating objects that are dropped into a body of water (e.g., an ocean) and/or are lying near a bottom surface of the body of water (e.g., the ocean floor). In some embodiments, the tracking system includes a buoyant transmitter assembly coupled to a tether (e.g., a line, rope, chain, wire, string, cord, cable, or the like), which facilitates tracking an attached object that has dropped into the body of water. For example, when an object, such as a BOP stack, is dropped into the ocean, the object may sink to the ocean floor and may strike the ocean floor with such velocity that the object becomes fully or partially covered or engulfed by mud at the ocean floor, or otherwise visibility obstructed (e.g., by a silt cloud). The tether may remain attached to the covered object and may enable the buoyant transmitter assembly to float above the covered object and above the mud along the ocean floor, thereby facilitating tracking the object. To facilitate discussion, the disclosed embodiments are described in the context of offshore drilling operations and the examples provided herein include offshore drilling components, such as a BOP stack; however, it should be understood that the disclosed tracking systems may be attached to any object (e.g., containers, boxes, ship cargo, barrels, pallets, tanks, or floating vessels themselves) that has the potential to be dropped or submerged in a body of water.

Figure 1:
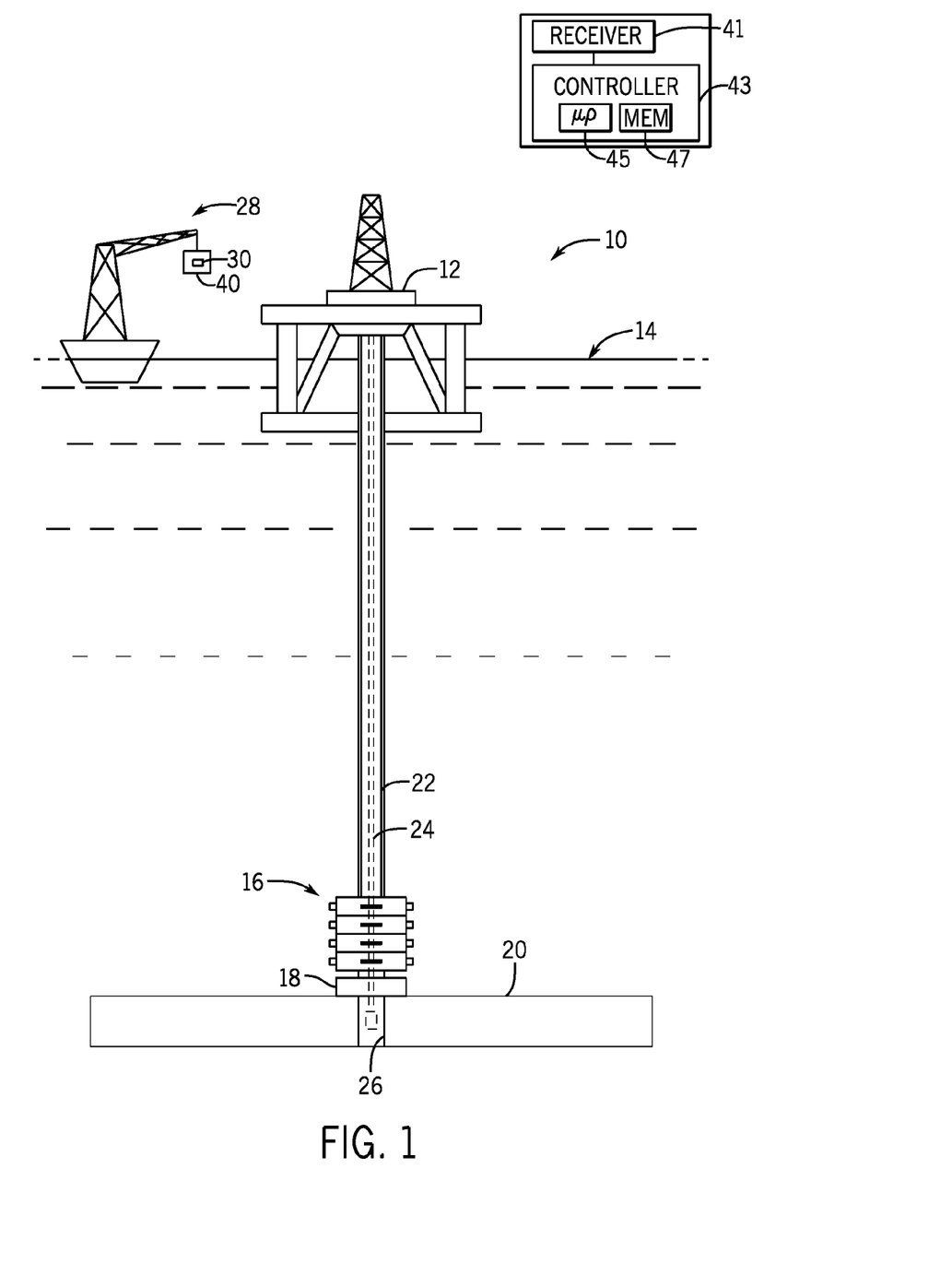
FIG. 1 is a schematic diagram of an offshore system, in accordance with an embodiment of the present disclosure.

With the foregoing in mind, FIG. 1 is an embodiment of an offshore system 10. The offshore system 10 includes an offshore vessel or platform 12 at an ocean surface 14. The platform 12 may support various types of drilling equipment. Some drilling equipment, such as a BOP stack 16, may be mounted to a wellhead 18 at an ocean floor 20. A tubular drilling riser 22 extends from the platform 12 toward the wellhead 18. The riser 22 may return drilling fluid or mud to the platform 12 during drilling operations. Downhole operations are carried out by a tubular string 24 (e.g., drill string, production tubing string, or the like) that extends from the platform 12, through the riser 22, and into a wellbore 26.

A transport vessel 28 (e.g., offshore crane or the like) may transport a component 30 (e.g., drilling equipment, such as a christmas tree, a BOP stack, a diverter, or the like) of the offshore system 10 from land to the platform 12. As shown, in some embodiments, the component 30 may be suspended above the ocean surface 14 during transport from the land to the platform 12. Should the component 30 inadvertently detach from the transport vessel 28 (e.g., due to failure of the attachment between the component 30 and the transport vessel 28 or the like), the component 30 may fall to the ocean floor 20. The ocean floor 20 may be covered in a thick layer of mud, and upon impact with the ocean floor 20, the component 30 may become fully or partially covered or engulfed by the mud, or otherwise obstructed from visibility. Without the disclosed embodiments, locating the dropped component 30 may be difficult and may require expensive resources, as well as a significant amount of time.

With the foregoing in mind, the disclosed embodiments may include a tethered tracking system 40 that is configured to be coupled to the component 30. As discussed in more detail below, the tethered tracking system 40 may include a buoyant transmitter assembly and a tether (e.g., a line, rope, chain, wire, string, cord, cable, or the like) that is configured to couple the buoyant transmitter assembly to the component 30. If the component 30 becomes covered by the mud at the ocean floor 20, the buoyant transmitter assembly may extend or float above the mud, thereby facilitating detection of the dropped object. For example, a receiver 41 may be configured to detect a signal emitted by the buoyant transmitter assembly. In some embodiments, the receiver 41 may be portable and/or submersible (e.g., able to be submerged in water). The receiver 41 may be communicatively coupled to a controller 43 having a processor 45 and a memory 47. The receiver 41 may provide the detected signal to the processor 45 of the controller 43, which may be configured to process the signal to determine the location of the buoyant transmitter assembly, and thus, the location of the component 30.

In certain embodiments, the controller 43 is an electronic controller having electrical circuitry configured to process the signal emitted by the buoyant transmitter assembly and detected by the receiver 41, for example. In the illustrated embodiment, the controller 43 includes a processor, such as the illustrated microprocessor 45, and the memory device 47. The controller 43 may also include one or more storage devices and/or other suitable components. The processor 45 may be used to execute software, such as software for controlling the receiver 41 to detect the signal from the buoyant transmitter assembly, and so forth. Moreover, the processor 45 may include multiple microprocessors, one or more "general-purpose" microprocessors, one or more special-purpose microprocessors, and/or one or more application specific integrated circuits (ASICS), or some combination thereof. For example, the processor 45 may include one or more reduced instruction set (RISC) processors.

The memory device 47 may include a volatile memory, such as random access memory (RAM), and/or a nonvolatile memory, such as ROM. The memory device 47 may store a variety of information and may be used for various purposes. For example, the memory device 47 may store processor-executable instructions (e.g., firmware or software) for the processor 45 to execute, such as instructions for processing the signal emitted by the buoyant transmitter assembly and detected by the receiver 41 to determine a location of the buoyant transmitter assembly, and thus, a location of the component 30. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., torque data, etc.), instructions (e.g., software or firmware for controlling the receiver 41, processing signals, etc.), and any other suitable data.

Figure 2:
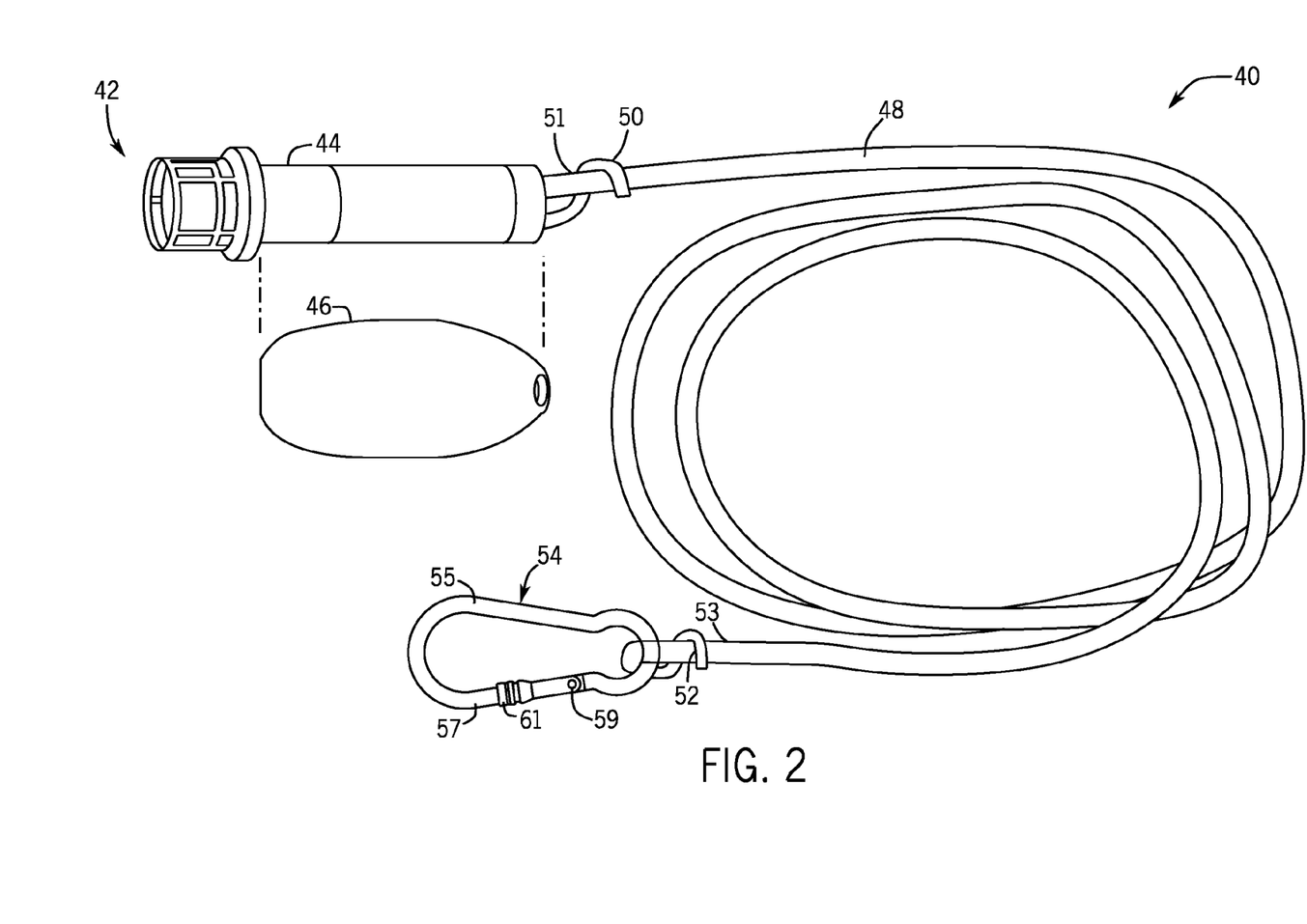
FIG. 2 is a perspective view of an embodiment of a tethered tracking system that may be used with various components of the offshore system of FIG. 1.

FIG. 2 is a perspective view of an embodiment of the tethered tracking system 40. As shown, the tethered tracking system 40 includes a buoyant transmitter assembly 42 having a transmitter 44 and a buoyant element 46. The transmitter 44 may be any suitable transmitter configured to communicate with a corresponding remote receiver. For example, the transmitter 44 may be an acoustic transmitter configured to emit acoustic waves (e.g., at ultrasonic or infrasonic frequencies), a radio transmitter configured to emit radio frequency waves, an optical transmitter configured to emit light waves, or any combination thereof. The transmitter 44 may be configured generally to emit acoustic, radio, light, vibration, seismic, magnetic, sonar, radar, GPS, thermal, and/or any other suitable signals and/or waves. In some embodiments, the transmitter 44 may be activated to emit a signal by an operator (e.g., the operator may activate the transmitter 44 via operation of a mechanical or electrical switch when the transmitter 44 is coupled to the component 30 or when the component 30 is loaded onto the transport vessel 28). In some embodiments, the transmitter 44 may be activated when the transmitter 44 contacts and/or is submerged in the body of water. The transmitter 44 may include any suitable detector configured to detect when the transmitter 44 contacts and/or is submerged in the body of water. For example, the transmitter 44 may include a pressure detector configured to detect pressure about the transmitter 44. When the pressure changes and/or exceeds a predetermined threshold, such as when the transmitter 44 contacts and/or is submerged in the body of water, the transmitter 44 may be activated to emit the signal. By way of another example, the buoyant transmitter assembly 42 and/or the tether 48 may include a pressure detector configured to detect a buoyant force pulling upward on the tether 48. When the buoyant force exceeds a predetermined threshold, such as when the transmitter 44 is floating in the body of water, the transmitter 44 may be activated to emit the signal. Such configurations may prolong the useful life of the transmitter 44 by conserving battery power. However, in some embodiments, the transmitter 44 may be configured to continuously emit the signal without activation at the time of use, thereby providing a reliable, smaller, and/or less expensive transmitter 44 that does not rely on operator and/or internal electronics for activation. In some embodiments, the transmitter 44 may be a transceiver configured to receive electronic control signals from a controller (e.g., the controller 43) that is communicatively coupled to the transceiver. For example, the transceiver may receive electronic control signals that cause the transceiver to begin emitting the signal and/or that cause the transceiver to adjust the type and/or characteristics (e.g., frequency, amplitude, or the like) of the emitted signal.

The buoyant element 46 may be any suitable floating device and may have any suitable configuration that enables the buoyant element 46 to support the transmitter 44 and/or to cause the transmitter 44 to float when submerged in the body of water. For example, the buoyant element 46 may be formed from a buoyant material or be a gas-filled enclosure (e.g., enclosure filled with air or inert gas). The buoyant element 46 may have any suitable shape. For example, in some embodiments, the buoyant element 46 may be an annular buoyant structure, such as a sleeve or tube. In some embodiments, the buoyant element 46 may be directly attached to the transmitter 44. For example, in the illustrated embodiment, the buoyant element 46 is configured to attach to and to circumferentially surround at least a portion of the transmitter 44. In such cases, the buoyant element 46 may protect the transmitter 44 from damage due to contact with parts of the component 30 or other objects, for example. In some embodiments, the buoyant element 46 may be attached to a tether 48 at a location proximate to the transmitter 44.

As shown, the tether 48 extends between the transmitter 44 and the component 30. In particular, a first portion 50 of the tether 48 may be coupled to the transmitter 44 (e.g., via a knot, a fused connection, a welded connection, a threaded connection, such as male and female fasteners, a pair of mating loops, or any suitable fastener or clamp that secures the first portion 50 of the tether 48 to another portion 51 of the tether 48 about a portion of the transmitter 44 or directly to the transmitter 44). In the illustrated embodiment, a second portion 52 of the tether 48 is coupled to an attachment element 54 (e.g., a ring, a clip, a carabiner, or the like) that is configured to be coupled to (e.g., removably coupled to) the component 30. In some embodiments, the second portion 52 of the tether 48 may be coupled to the attachment component 54 via a knot, a fused connection, a welded connection, a threaded connection (e.g., male and female fasteners), a pair of mating loops, or any suitable fastener or clamp that secures the second portion 52 of the tether 48 to another portion 53 of the tether 48 about the attachment component 54 or directly to the attachment component 54. In some embodiments, the second portion 52 of the tether 48 may be configured to couple directly to the component 30 (e.g., via a knot, a fused connection, a welded connection, a threaded connection, such as male and female fasteners, a pair of mating loops, or any suitable fastener or clamp that secures the second portion 52 of the tether 48 to another portion 53 of the tether 48 about a portion of the component 30 or directly to the component 30). The tether 48 may be a line, rope, chain, wire, string, cord, cable, or the like, made from any suitable material or combination of materials, such as polypropylene, nylon, polyesters, polyethylene, acrylics, metals, metal alloys, or the like. The tether 48 may have any suitable length to enable the buoyant transmitter assembly 42 to float above the ocean floor 20 even while the attached component 30 is submerged within the mud at the ocean floor 20. For example, the tether 48 may have a length of approximately 1 to 100, 5 to 75, 10 to 50, 15 to 30, or 20 to 25 meters (m). In some embodiments, the tether 48 may have a length greater than approximately 1, 5, 10, 15, 20, 25, 30, 35, 40, 45, 50, 75, or 100 meters.

In the illustrated embodiment, the attachment element 54 is coupled to the second portion 52 of the tether 48 via a fused connection (e.g., the second portion 52 of the tether 48 is melted to another portion 53 of the tether 48), but a knot, a welded connection, a threaded connection (e.g., male and female fasteners), a pair of mating loops, or any suitable fastener or clamp may be utilized. Furthermore, the illustrated attachment element 54 is a carabiner having a metal loop or ring 55, a spring clip 57, a hinge 59 that rotatably couples the spring clip 57 to the ring 55 and enables the spring clip 57 to open and close, and a sleeve 61 that is threadably coupled to the spring clip 57 and moves along the spring clip 57 to secure the spring clip 57 to the ring 55 (e.g., block the spring clip 57 from separating from the ring 55) and/or to enable the spring clip 57 to separate from the ring 55, although any suitable fastener may be used to couple the tethered tracking system 40 to the component 30. The attachment element 54 may be configured to removably couple the tethered tracking system 40 to the component 30. In such cases, an operator may couple the tethered tracking system 40 to the component 30 prior to transport to the platform 12 and may remove the tethered tracking system 40 from the component 30 upon successful delivery of the component 30 to the platform 12, for example. Such a configuration enables reuse of the tethered tracking system 40.

Figure 3:
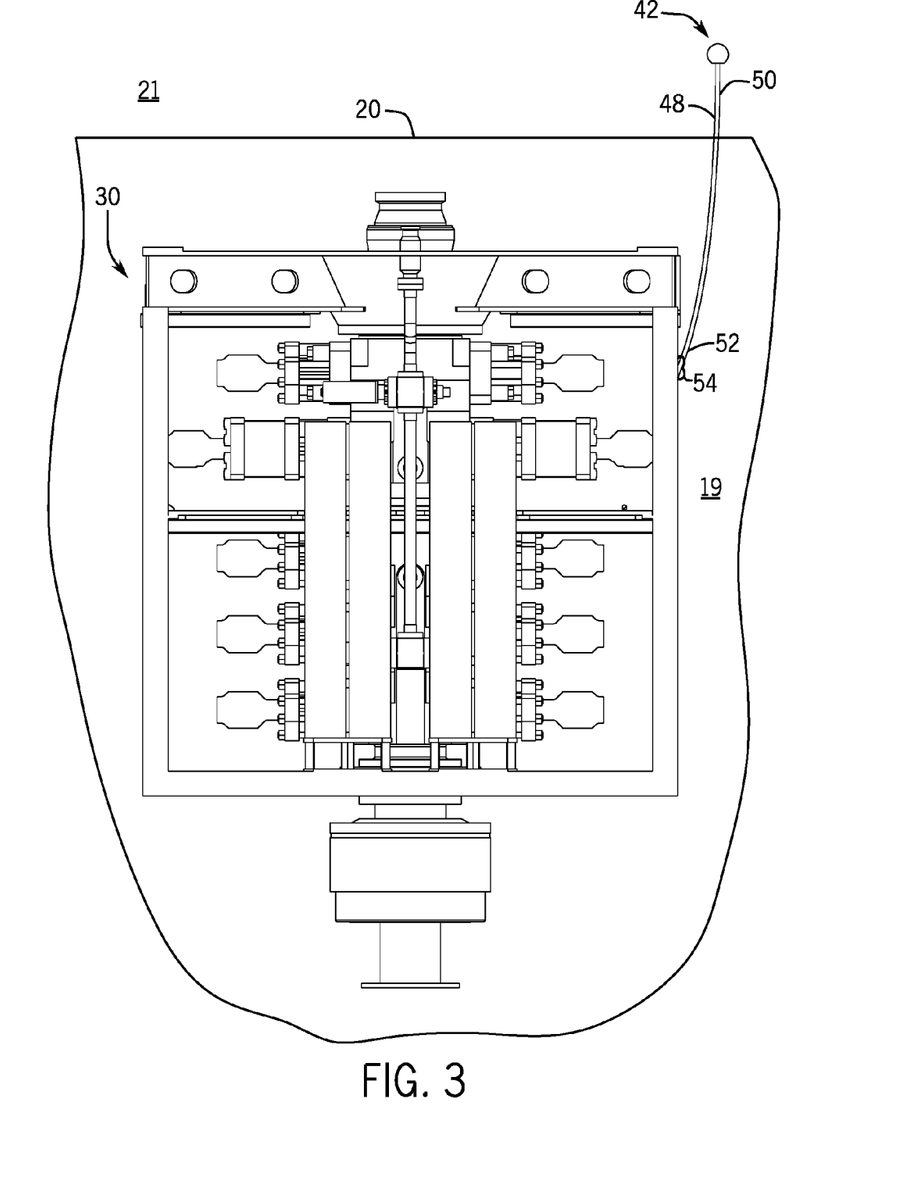
FIG. 3 is a side view of an embodiment of the tethered tracking system of FIG. 2 coupled to a blowout preventer (BOP) stack.

FIG. 3 is a side view of an embodiment of the tethered tracking system 40 coupled to the component 30, wherein the component 30 is covered by mud 19 at the ocean floor 20. As shown, the second portion 52 of the tether 48 is coupled to the component 30 via the attachment element 54, and the first portion 50 of the tether 48 is coupled to the buoyant transmitter assembly 42. As such, the buoyant transmitter assembly 42 floats above the component 30 and above the ocean floor 20 in water 21, thereby facilitating detection of the covered component 30. For example, the transmitter 44 of the buoyant transmitter assembly 42 may emit a signal (e.g., an acoustic signal, a radio signal, an optical signal, or the like) that may be detected by a corresponding remote receiver. While the component 30 in FIG. 3 is a BOP stack, the component 30 may be any type of drilling equipment or other object that has the potential to be dropped into a body of water.

Figure 4:
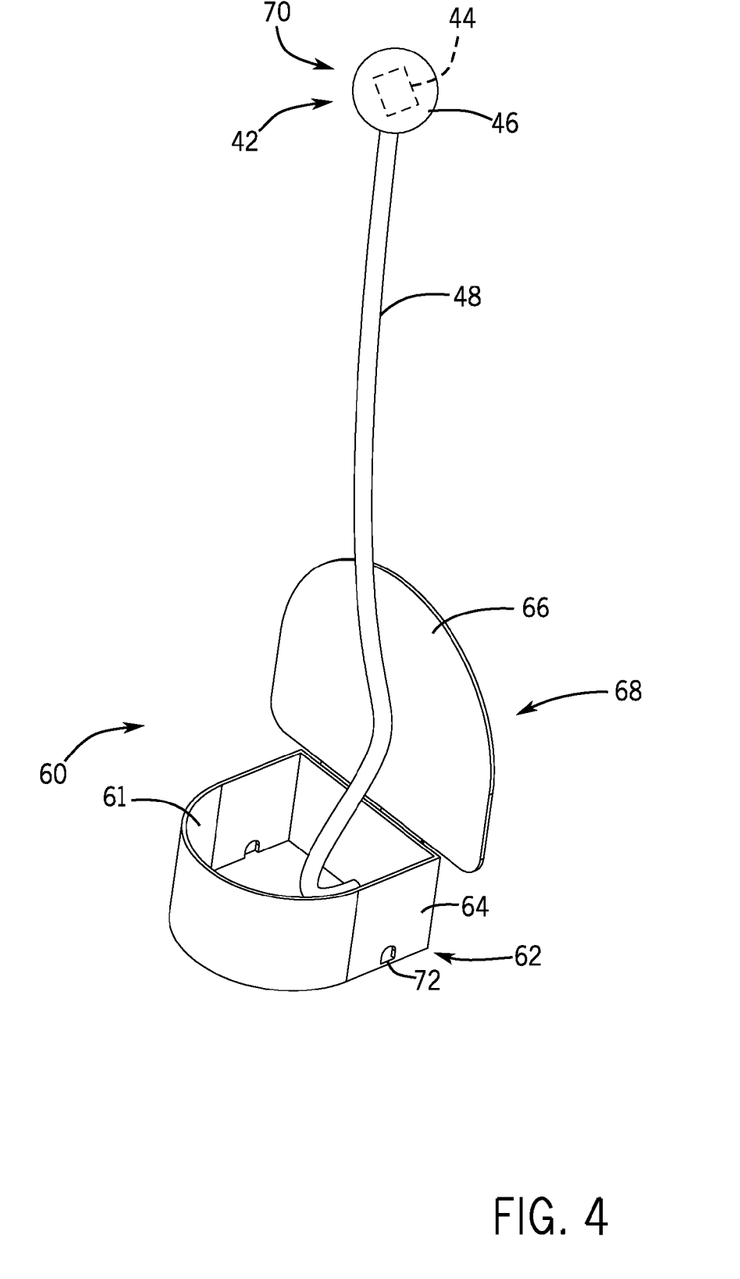
FIG. 4 is an isometric view of an embodiment of a tethered tracking system having a housing that may be used with various components of the offshore system of FIG. 1.

FIG. 4 is an isometric view of another embodiment of a tethered tracking system 60 having a housing 62. The tethered tracking system 60 may also include some or all of the components discussed above with respect to FIG. 2. For example, the tethered tracking system 60 may include the buoyant transmitter assembly 42 having the transmitter 44 and the buoyant element 46. The tethered tracking system 60 may also include the tether 48. Any suitable fastener or attachment element, such as the attachment element 54, may be provided to couple the tether 48 to the housing 62. In some embodiments, the tether 48 may be directly coupled to the housing 62 via a knot, a fused connection, a welded connection, a threaded connection (e.g., male and female fasteners), a pair of mating loops, or any suitable fastener or clamp that secures the second portion 52 of the tether 48 to another portion 53 of the tether 48 about a portion of the housing 62 or directly to the housing 62. As shown, the housing 62 includes a body 64 (e.g., housing portion) and a movable lid 66 (e.g., hinged or rotatable lid, slideable lid, or the like). In the illustrated embodiment, the movable lid 66 is coupled to the body 64 via a hinged coupling. In the illustrated embodiment, the movable lid 66 is in an open position 68 and the buoyant transmitter assembly 42 is in a deployed position 70. In some embodiments, the body 64 or other portion of the housing 62 may include openings 72 to facilitate coupling the housing 62 to the component 30 and/or to enable fluid to flow into the housing 62 to balance pressure between the external environment and interior 61 of the housing 62. For example, if the housing 62 is positioned on equipment that is intended to be lowered to the subsea wellhead 18 in a controlled manner or at a low velocity, (e.g., the BOP stack 16), the openings 72 may enable fluid to flow into the housing 62 to balance pressure as the equipment is lowered into the ocean. In some embodiments, the openings 72 may not be provided and the housing 62 may be sealed (e.g., hermetically sealed or impermeable to fluid) when the movable lid 66 is in a closed position.

Figure 5:
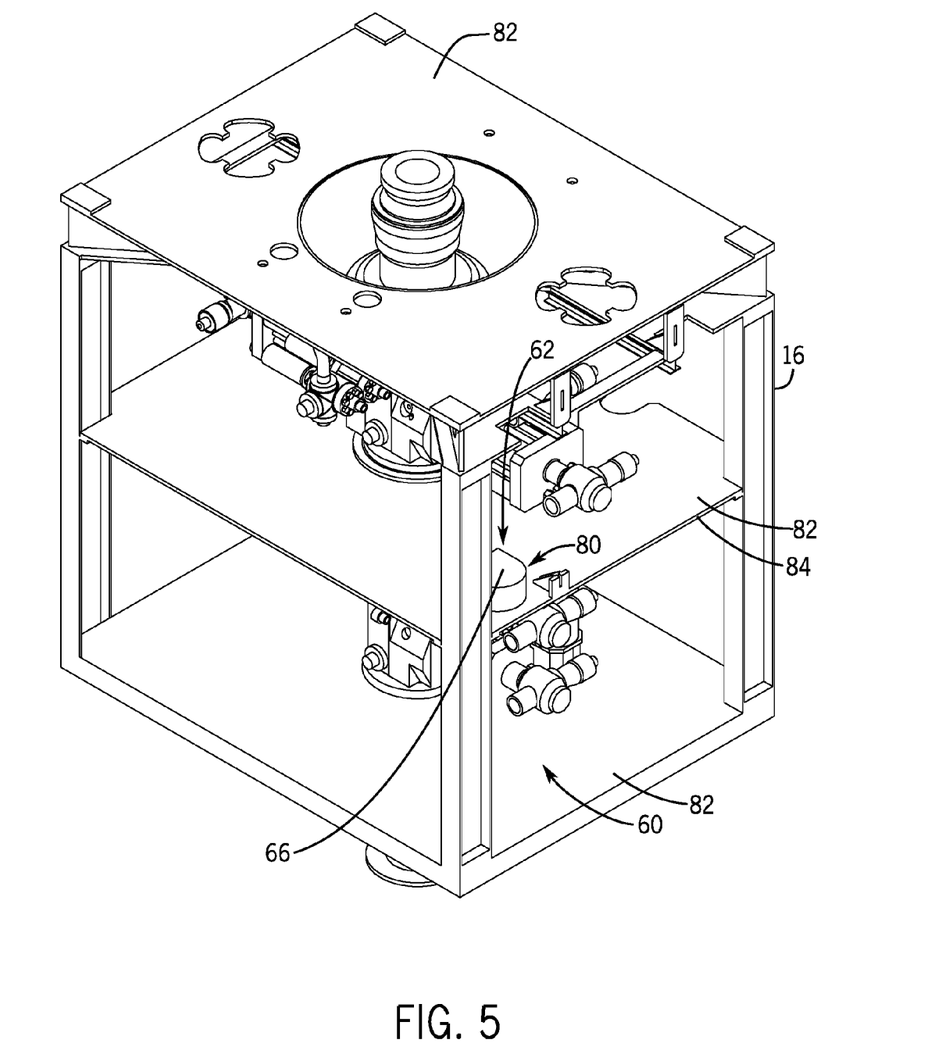
FIG. 5 is an isometric view of an embodiment of the tethered tracking system of FIG. 4 coupled to a BOP stack, wherein a lid of the housing is in a closed position.

FIG. 5 is an isometric view of an embodiment of the tethered tracking system 60 coupled to the BOP stack 16, wherein the housing 62 is in a closed position 80. When the housing 62 is in the closed position 80, the buoyant transmitter assembly 42 (e.g., the transmitter 44 and the buoyant element 46), the tether 48, and/or the attachment component 54 may be contained within the housing 62 and/or covered by the movable lid 66. As noted above, the housing 62 may be coupled to the BOP stack 16 via any suitable fastener (e.g., threaded fastener, welded connection, or the like). In some embodiments, the housing 62 may be positioned on an axial surface 82 of the BOP stack 16. The housing 62 may be positioned proximate to an edge 84 of the axial surface 82 (e.g., within 1, 2, 3, 4, 5, 10, 15, 20, or 25 centimeters (cm) of the edge 84) to limit the chance of the buoyant transmitter assembly 42 becoming entangled or trapped within the BOP stack 16 when the movable lid 66 moves to the open position 68. The movable lid 66 may be configured to remain in the closed position 80 as the BOP stack 16 is transported by the transport vessel 28 and/or while the BOP stack 16 is lowered to the wellhead 18 in a controlled manner at a low velocity. For example, the movable lid 66 may have a weight and/or a hinge or other biasing member of the movable lid 66 may have a spring constant that enables the movable lid 66 to remain in the closed position 80 as the BOP stack 16 is transported by the transport vessel 28 and/or while the BOP stack 16 is lowered to the wellhead 18. However, the movable lid 66 may be configured to move from the closed position 80 to the open position 68 when the BOP stack 16 is dropped and enters or freely moves (e.g., is not lowered in a controlled manner) through the fluid at a high velocity. In certain embodiments, the buoyant element 46 may drive the movable lid 66 from the closed position 80 to the open position 68 when the housing 62 is submerged in water. For example, when submerged in water, the water may flow into the housing 62 causing the buoyant element 46 to float and to exert an upward force on the movable lid 66, thereby causing the movable lid 66 to open.

Figure 6:
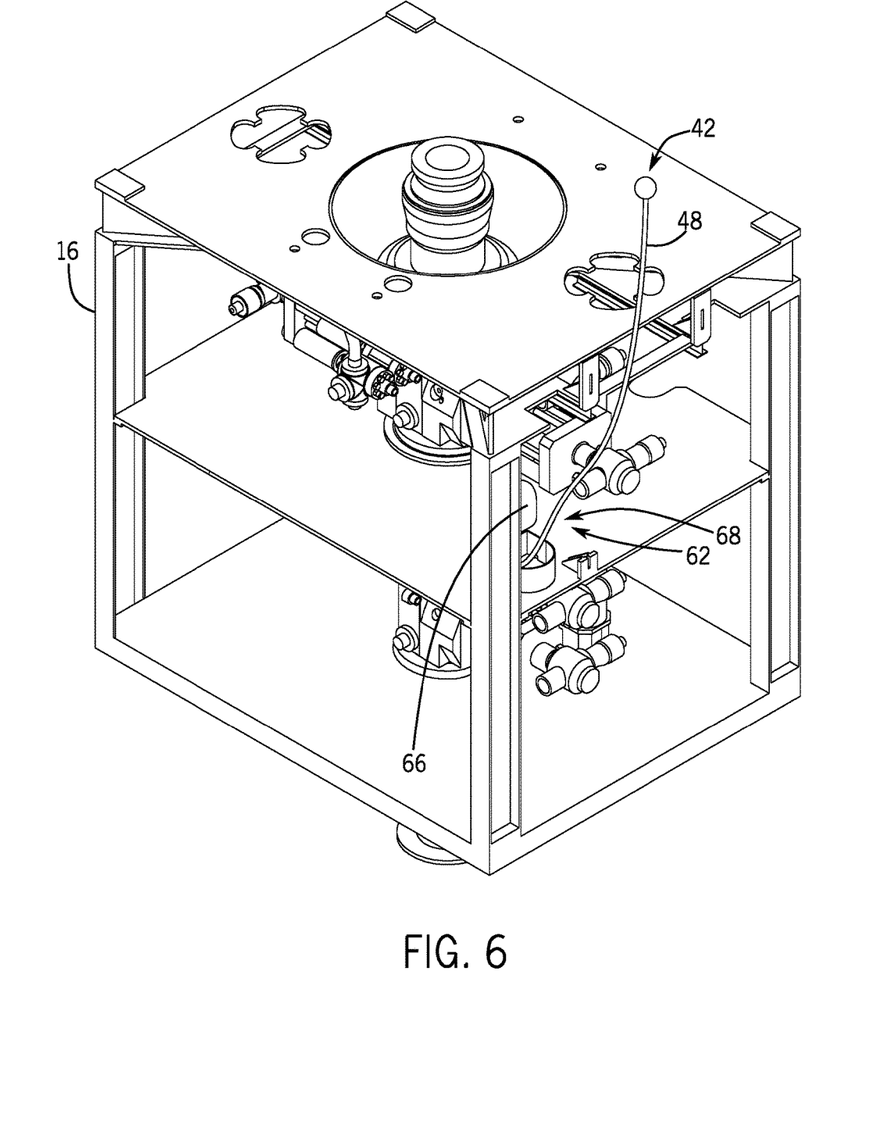
FIG. 6 is an isometric view of an embodiment of the tethered tracking system of FIG. 5 coupled to the BOP stack, wherein the lid of the housing is in an open position.

FIG. 6 is an isometric view of an embodiment of the tethered tracking system 60 coupled to the BOP stack 16 that is submerged within a body of water, wherein the housing 62 is in the open position 68. As noted above, when the BOP stack 16 drops toward the ocean floor 20, the fluid flowing about the BOP stack 16 forces (e.g., causes) the movable lid 66 to move from the closed position 80 to the open position 68, thereby releasing the buoyant transmitter assembly 42 and causing the buoyant transmitter assembly 42 to move out of the housing 62 to the deployed position 70. As discussed above, the tether 48 has a length that enables the buoyant transmitter assembly 42 to extend above the component 30 and/or above the ocean floor 20. Even if the BOP stack 16 becomes partially or fully covered by mud at the ocean floor 20, the buoyant transmitter assembly 42 may remain above the ocean floor 20 and may facilitate detection of the BOP stack 16. For example, the transmitter 44 of the buoyant transmitter assembly 42 may emit a signal that is detectable by a corresponding remote receiver. While the component 30 in FIGS. 5 and 6 is a BOP stack, it should be understood that the component 30 may be any type of drilling equipment or other object that has the potential to be dropped into a body of water.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A tracking system comprising:
 a tether;
 a transmitter coupled to a first portion of the tether and configured to transmit a signal receivable by a remote receiver;
 a buoyant element coupled to the transmitter or to the first portion of the tether, wherein the buoyant element is configured to cause the transmitter to float when the transmitter is submerged in a fluid; and
 a housing coupled to a second portion of the tether and configured to be affixed to and positioned on equipment for use with oil and gas wells, wherein the housing is configured to cover the tether, the transmitter, and the buoyant element while the housing is in a closed configuration and to enable the first portion of the tether, the transmitter, and the buoyant element to move out of the housing while in an open configuration, wherein the housing comprises a biasing member configured to bias a lid portion of the housing toward the closed configuration to enable the housing to remain in the closed configuration while the equipment moves through the fluid in a controlled manner at a first velocity and to enable the housing to move from the closed configuration to the open configuration in response to the equipment moving freely through the fluid at a second velocity greater than the first velocity, and wherein the tracking system is configured to facilitate detecting the equipment when the equipment is submerged in the fluid.

2. The tracking system of claim 1, wherein the tracking system is configured to be coupled to the housing via an attachment element coupled to the second portion of the tether.

3. The tracking system of claim 2, wherein the attachment element comprises a loop and a spring clip that enables the tracking system to be removably coupled to the housing.

4. The tracking system of claim 1, wherein the tether has a length greater than approximately 5 meters.

5. The tracking system of claim 1, wherein the transmitter comprises an acoustic transmitter, a light emitter, or a radio transmitter.

6. The tracking system of claim 1, wherein the buoyant element circumferentially surrounds at least a portion of the transmitter.

7. The tracking system of claim 1, comprising the receiver configured to detect the signal transmitted by the transmitter.

8. The tracking system of claim 1, wherein the transmitter is configured to be activated to begin emitting the signal in response to being submerged in the fluid.

9. The tracking system of claim 8, comprising a sensor configured to detect when the transmitter is submerged in the fluid.

10. The tracking system of claim 9, wherein the sensor comprises a pressure sensor.

11. The tracking system of claim 1, wherein the equipment comprises a blowout preventer (BOP) assembly.

12. The tracking system of claim 11, wherein the housing is coupled to the BOP assembly proximate to an edge of an axial surface of the BOP assembly.

13. The tracking system of claim 1, wherein the housing comprises openings to enable the fluid to flow into the housing to balance pressure between an interior of the housing and an environment external to the housing.

14. A method of using a tracking system to detect an object a blowout preventer (BOP) assembly submerged in a fluid, the method comprising:
 containing a tether, a transmitter coupled to a first portion of the tether, and a buoyant element coupled to the transmitter or to the first portion of the tether within a housing affixed to and positioned on the BOP assembly while the housing is in a closed configuration;
 moving the housing from the closed configuration to an open configuration in response to the BOP assembly being dropped into the fluid to enable the first portion of the tether, the transmitter, and the buoyant element to move out of the housing, wherein the buoyant element causes the transmitter to float within the fluid; and
 transmitting, using the transmitter, a signal to a remote receiver to facilitate detecting the BOP assembly submerged in the fluid.

15. The method of claim 14, comprising biasing the housing toward the closed configuration to enable the housing to remain in the closed configuration while the BOP assembly moves through the fluid in a controlled manner at a first velocity.

16. The method of claim 15, wherein moving the housing from the closed configuration to the open configuration in response to the BOP assembly being dropped into the fluid comprises moving the housing in response to the BOP assembly being dropped and moving freely through the fluid at a second velocity greater than the first velocity.

17. A system, comprising:
a component for use in drilling an offshore well or extracting resources from the offshore well;
a tracking system coupled to the component, the tracking system comprising:
a tether;
a transmitter coupled to a first portion of the tether and configured to transmit a signal receivable by a remote receiver;
a buoyant element coupled to the transmitter or to the first portion of the tether, wherein the buoyant element is configured to cause the transmitter to float when the transmitter is submerged in a fluid; and
a pressure sensor configured to detect a buoyant force pulling on the tether, wherein the transmitter is configured to be activated to begin emitting the signal in response to detection of the buoyant force exceeding a threshold buoyant force, and wherein the tracking system is configured to facilitate detecting the component when the component is submerged in the fluid.

18. The system of claim 17, wherein the tracking system comprises a housing coupled to a second portion of the tether and configured to be positioned on the component, wherein the housing is configured to cover the tether, the transmitter, and the buoyant element while the housing is in a closed configuration and to enable the first portion of the tether, the transmitter, and the buoyant element to move out of the housing while the housing is in an open configuration.

19. The system of claim 18, wherein the housing is biased toward the closed configuration to enable the housing to remain in the closed configuration while the component moves through the fluid in a controlled manner at a first velocity and to enable the housing to move from the closed configuration to the open configuration in response to the component moving freely through the fluid at a second velocity greater than the first velocity.

20. The system of claim 17, wherein the component comprises a blowout preventer (BOP) assembly.

* * * * *